T. F. WOODBRIDGE & A. P. GERLACH.
Treadle-Motions.
No. 199,484. Patented Jan. 22, 1878.
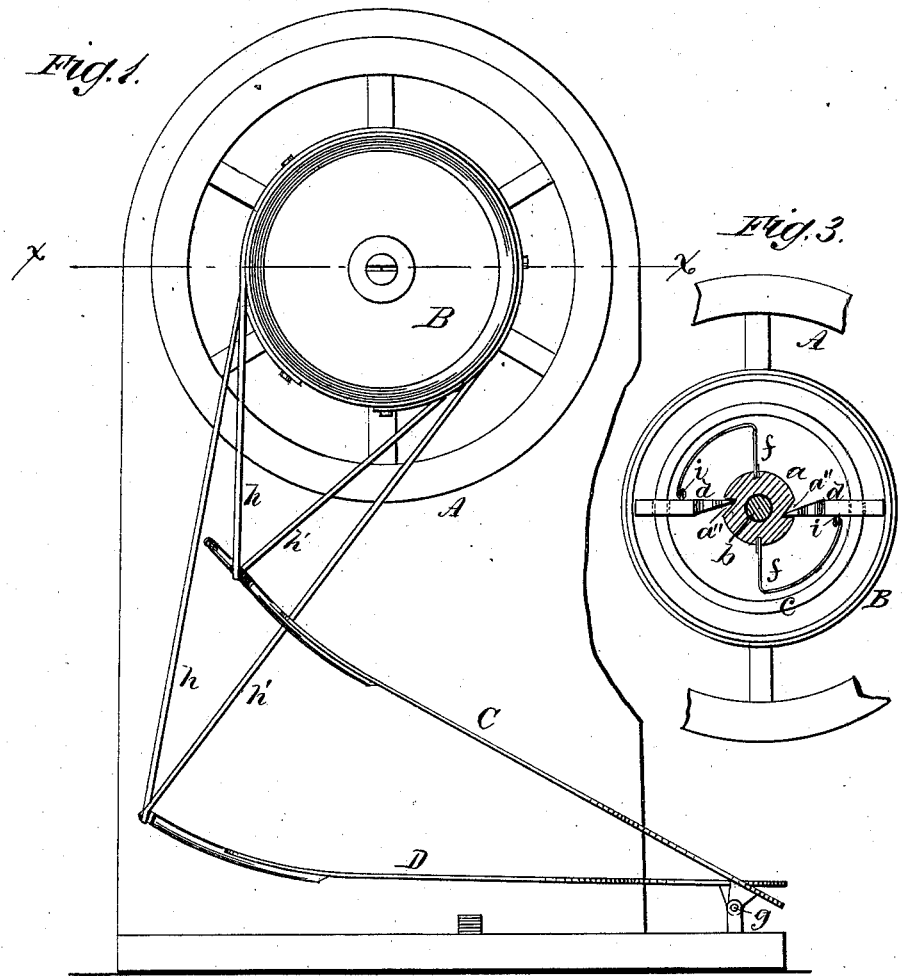
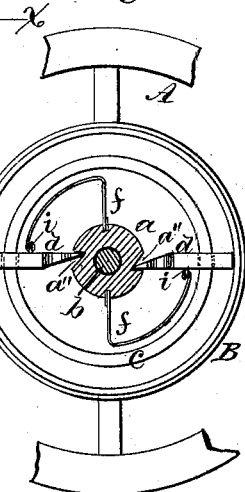
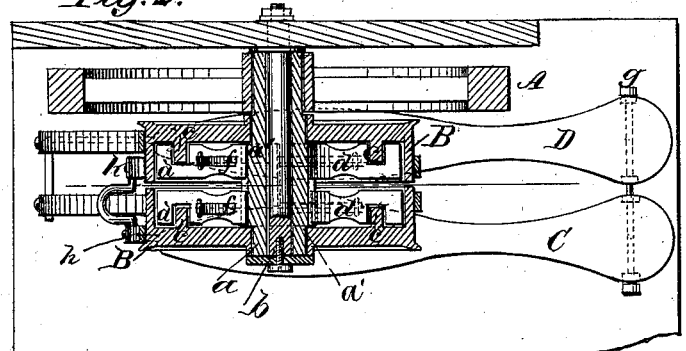
WITNESSES:
F. McArdle,
J. H. Scarborough.
INVENTORS
T. F. Woodbridge
A. P. Gerlach.
BY
ATTORNEYS.

UNITED STATES PATENT OFFICE.

THEODORE F. WOODBRIDGE AND ANDREW P. GERLACH, OF MENDOTA, ILL.

IMPROVEMENT IN TREADLE-MOTIONS.

Specification forming part of Letters Patent No. 199,484, dated January 22, 1878; application filed June 11, 1877.

*To all whom it may concern:*

Be it known that we, THEODORE F. WOODBRIDGE and ANDREW P. GERLACH, of Mendota, in the county of La Salle and State of Illinois, have invented a new and Improved Power and Treadle Motion, of which the following is a specification:

Figure 1 is a side elevation of a machine containing our improvements; Fig. 2, a horizontal section on line $x$ $x$ in Fig. 1; and Fig. 3, a detail view of one of the drums, showing internal working parts.

Similar letters of reference indicate corresponding parts.

The nature of our invention consists in the construction and arrangement of a treadle-motion for propelling sewing-machines or other light machinery, as will be hereinafter more fully set forth.

In the annexed drawings, which fully illustrates our invention, A represents the band-wheel of a sewing-machine, mounted upon a stud or short shaft, $b$, and which is to receive rotary motion by the means hereinafter described. In the center of the wheel A is keyed or otherwise firmly attached a hub or sleeve, $a$, which is formed with shoulders or offsets $a'$ $a'$, one next to the wheel and the other at the end of the hub. On these shoulders are placed two loose pulleys, B B, as shown. These pulleys are made hollow or cup-shaped, and in the bottom of each is a concentric flange, $c$, about one-half the height of the rim of the pulley. On this flange, in each pulley, are placed two dogs, $d$ $d$, the inner ends of which are beveled and placed in longitudinal grooves $a''$ $a''$ on opposite sides of the sleeve or hub $a$, and the outer ends made to bind on the inside of the rim of the pulley when the pulley is turned in one direction. Each dog $d$ is held by means of a spring, $f$, one end of which is fastened in the hub, and the other end of the same hooked into a staple, $i$, on the side of the dog.

When the pulley is turned from the springs, the dogs will not bind; but when it is turned against the springs the dogs will bind on the flange $c$, they being slotted to fit over the same and on the rim of the pulley, thus forming a double purchase, and will cause the hub $a$ and wheel A to rotate with it.

By the flanges $c$ entering the slots in the dogs, it will be seen that each dog has two points of contact on the flanges, one on the inside and one on the outside, and hence there is no possibility of slipping, as is often the case in devices of this character.

On the outside of each pulley are fastened two straps, $h$ $h'$, which are wound around the pulley in opposite directions, and connect with two treadles, C D, as shown, the strap $h$ from one pulley and $h'$ from the other pulley being connected to the same treadle. By working these treadles alternately up and down it will be seen that one pulley will move forward while the other moves backward, and vice versa, thus imparting a continuous rotary motion to the wheel A.

This device may be used for running sewing or other light machines.

I am aware that it is not new to use two loose pulleys connected with treadles by a single belt, and to employ pawls working in a socket of pulley-rims, and held by a spiral spring to the smooth surface of a shaft-hub; but

What I claim is—

The circular hubs $a$, ratcheted and connected with rims of the pulleys B B by spring-pawls, in combination with reversed belts $h$ $h'$, connected with treadles, as shown and described, whereby the hub that is fast to shaft may be rotated, as specified.

THEODORE F. WOODBRIDGE.
ANDREW P. GERLACH.

Witnesses:
DAVID RUDE,
L. R. CURTISS.